United States Patent
Paz Duart

(10) Patent No.: US 11,414,212 B2
(45) Date of Patent: Aug. 16, 2022

(54) LAUNCH AND LAND SYSTEM FOR A TETHERED AIRCRAFT

(71) Applicant: AMPYX POWER B.V., The Hague (NL)

(72) Inventor: Marcos Paz Duart, Rotterdam (NL)

(73) Assignee: AMPYX Power B.V., The Hague (NL)

( * ) Notice: Subject to any disclaimer, the term of this patent is extended or adjusted under 35 U.S.C. 154(b) by 193 days.

(21) Appl. No.: 16/500,197

(22) PCT Filed: Apr. 11, 2018

(86) PCT No.: PCT/EP2018/059307
§ 371 (c)(1),
(2) Date: Oct. 2, 2019

(87) PCT Pub. No.: WO2018/189251
PCT Pub. Date: Oct. 18, 2018

(65) Prior Publication Data
US 2021/0107685 A1    Apr. 15, 2021

(30) Foreign Application Priority Data

Apr. 11, 2017 (DE) ..................... 10 2017 003 499.0
Apr. 11, 2017 (DE) ..................... 10 2017 003 500.8

(51) Int. Cl.
*B64F 3/00* (2006.01)
*B64F 1/02* (2006.01)
*B64C 39/02* (2006.01)

(52) U.S. Cl.
CPC .............. *B64F 3/00* (2013.01); *B64C 39/022* (2013.01); *B64F 1/029* (2020.01)

(58) Field of Classification Search
CPC .......... B64F 3/00; B64C 39/022; A63H 27/04
See application file for complete search history.

(56) References Cited

U.S. PATENT DOCUMENTS

| 8,453,966 | B2 | 6/2013 | McGeer et al. |
| 9,637,245 | B2 | 5/2017 | Yoffe |
| 2005/0178894 | A1 | 8/2005 | McGeer et al. |

(Continued)

FOREIGN PATENT DOCUMENTS

| CN | 103121509 A | 5/2013 |
| DE | 1028893 B | 4/1958 |

(Continued)

OTHER PUBLICATIONS

International Search Report dated Jul. 16, 2018 filed in PCT/EP2018/059307.

*Primary Examiner* — Timothy D Collins
*Assistant Examiner* — Eric Acosta
(74) *Attorney, Agent, or Firm* — Rankin, Hill & Clark LLP

(57) ABSTRACT

Launch and land system for a tethered aircraft (in connection with FIG. 1) The invention provides for a launch and land system (1) for a tethered aircraft (90) comprising a runway (12) for the aircraft and a winch (62) for the tether (92), wherein the runway comprises a funnel-shaped target area (14) with a wide end oriented towards one end of the runway and a narrow end opposite of the wide end, wherein said target area is laterally bordered by restriction devices (80) extending from one end of the target area to the other for preventing the aircraft to roll out of the target area.

9 Claims, 8 Drawing Sheets

(56) References Cited

U.S. PATENT DOCUMENTS

Figure 1:
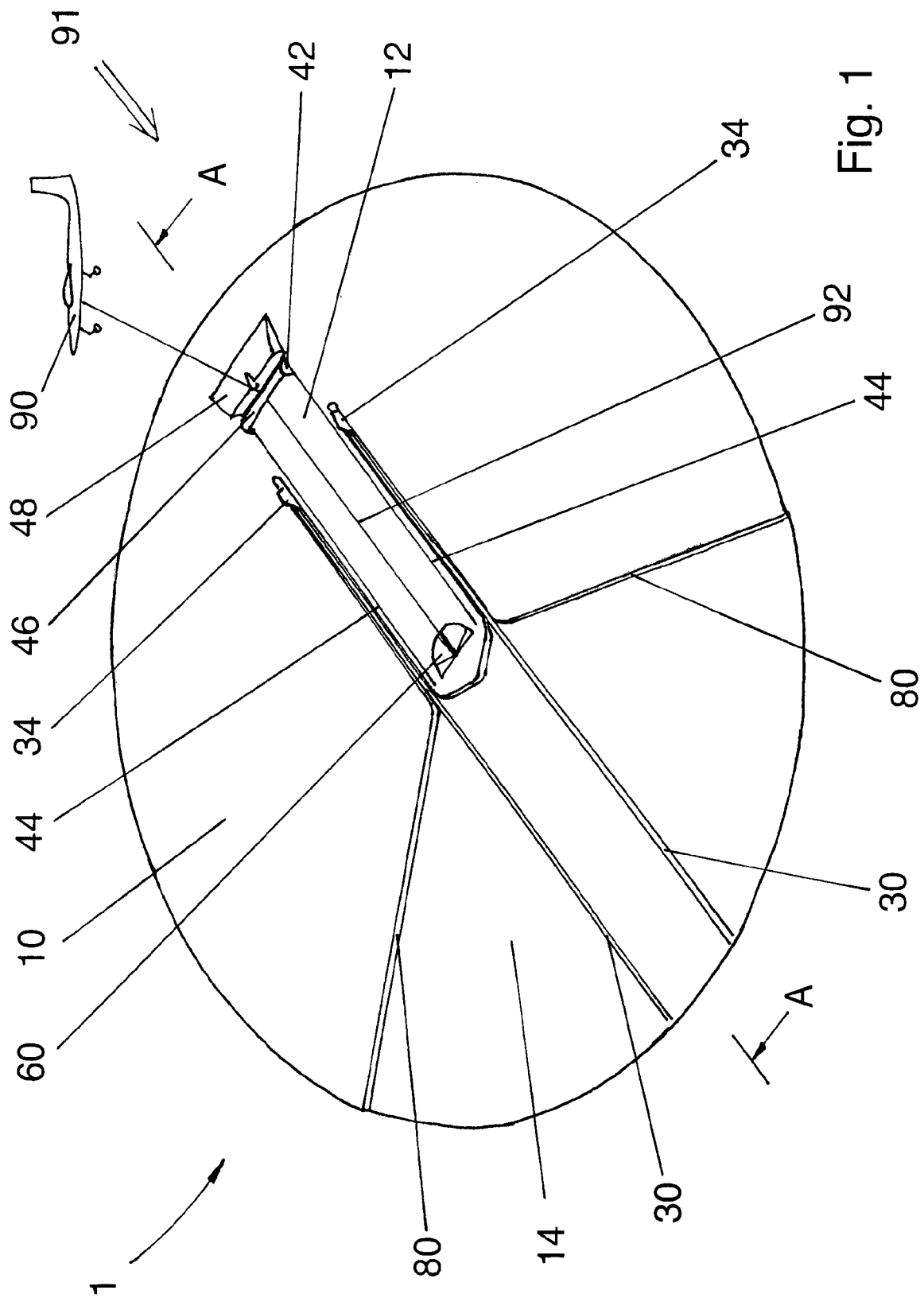

| | | |
|---|---|---|
| 2010/0032948 A1 | 2/2010 | Bevirt |
| 2011/0024559 A1 | 2/2011 | McGeer et al. |
| 2014/0361122 A1 | 12/2014 | Ruiterkamp |
| 2015/0129716 A1 | 5/2015 | Yoffe |

FOREIGN PATENT DOCUMENTS

| | | | |
|---|---|---|---|
| EP | 2218642 A2 * | 8/2010 | ................ B64F 1/28 |
| EP | 2218642 A2 | 8/2010 | |
| EP | 2631468 A1 | 8/2013 | |
| ES | 2258899 A1 | 9/2006 | |
| GB | 2387156 A | 10/2003 | |
| WO | 2013156680 A1 | 10/2013 | |
| WO | 2013171735 A1 | 11/2013 | |

* cited by examiner

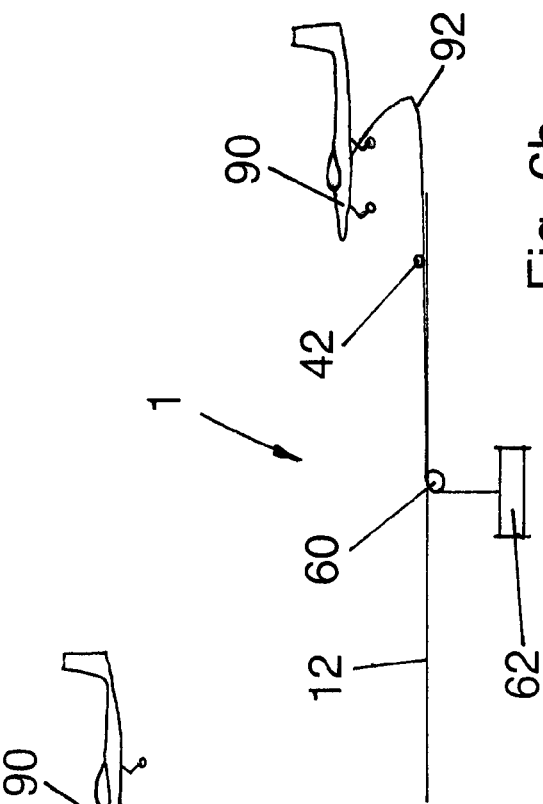
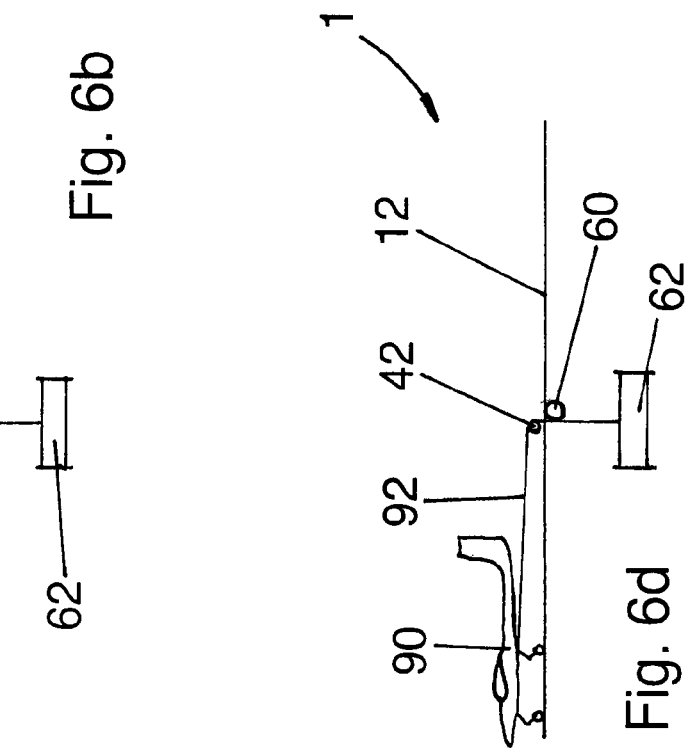
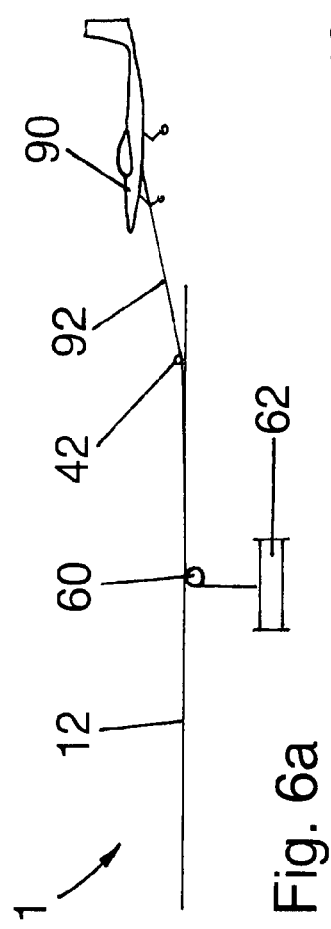
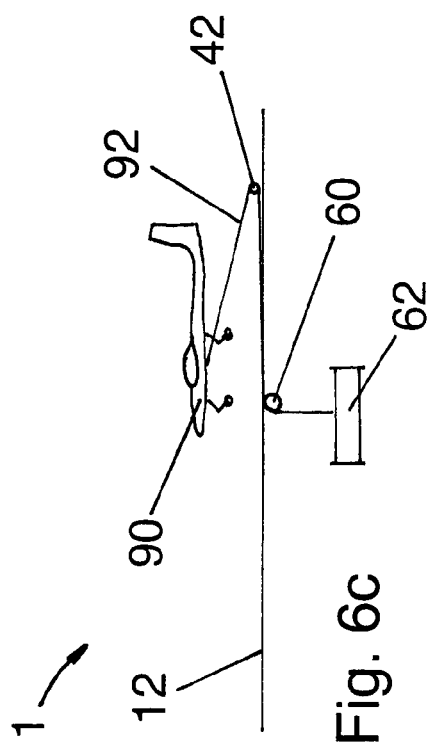

LAUNCH AND LAND SYSTEM FOR A TETHERED AIRCRAFT

The invention relates to a method for landing a tethered aircraft. The invention further relates to a launch and land system for a tethered aircraft.

Tethered aircrafts are for instance known from airborne wind energy production. An example for a respective system by the applicant is described in detail in EP 2 631 468 A1.

For efficient and economic operation of such systems, a high degree of automation is desirable, in particular during launching, landing, and ground handling of the aircraft. It is thus an object of the invention to provide for a high degree of automation during launching and/or landing and/or ground handling of a tethered aircraft.

According to the invention, this object is achieved by a launch and land system for a tethered aircraft comprising a runway for the aircraft and a winch for the tether, wherein the runway comprises a funnel-shaped target area with a wide end oriented towards one end of the runway and a narrow end opposite of the wide end, wherein said target area is laterally bordered by restriction devices extending from one end of the target area to the other for preventing the aircraft to roll out of the target area.

It is an aspect of the invention that the aircraft, once landed and rolling on the runway, is restricted to the target area. This simplifies automated ground handling because the aircraft can be assumed to remain inside a restricted area on the ground.

It is another aspect of the invention that the target area is funnel-shaped with one wide end and one narrow end, wherein in particular the aircraft can be landed in a direction from the narrow end towards the wide end of the wide end of the funnel-shaped target area.

The invention thus enables to pull back the aircraft after landing by means of the tether, thereby pulling the aircraft towards the narrow end of the funnel-shaped target area, thereby further and further restricting the lateral position of the aircraft within the target area. Within the narrow end of the target area, the aircraft thus can be positioned at a well defined position and orientation.

Preferably, said launch and land system further comprises a guide device for said tether, wherein said guiding device is preferably arranged close to the narrow end of the target area. This way, the tether is available for pulling back the aircraft all the way to the narrow end of the target area.

For instance, said guiding device comprises a swivel mechanism.

In some embodiments of the invention, said restriction devices comprise guide rails for guiding a landing gear of said aircraft. Said guide rails are preferably designed and arranged for engagement with guiding surfaces provided at the landing gear of the aircraft, which minimizes wear at the landing gear and at the guide rails alike.

A beneficial layout of the landing gear comprises a main landing gear with two wheels or wheels sets at given distance and a nose landing gear with two wheels or wheel sets at the same distance. This way, when hitting a restriction device with any of those wheels or wheel sets of the main landing gear, the aircraft will turn until the corresponding wheel or wheel set, respectively, of the nose landing gear reaches the same restriction device. Due to the equal width of main landing gear and nose landing gear, the aircraft now will roll straight alongside the restriction device without shear forces on the wheels.

In a preferred embodiment of the invention, the launch and land system further comprises a re-orientation device arranged at the narrow end of the funnel-shaped target area for aligning the grounded aircraft with the runway. In case the aircraft is not properly aligned with the runway after pulling back, it is thus made possible to re-orient or turn the aircraft by means of the re-orientation device. For example, the re-orientation device may comprise a turntable for this purpose.

In some embodiments of the invention, the re-orientation device comprises a middle guide rail arranged essentially across the narrow end of the funnel-shaped target area. The middle guide rail can be shaped appropriately to re-orient or align the aircraft when pulled back. In most cases, it will be sufficient for this purpose that an angle between the middle guide rail and one of the outer guide rails is larger than 90°, for example 110° or more.

In a preferred embodiment, the middle guide rail comprises a straight section, wherein the straight section is aligned essentially perpendicular to the runway. This way, the angle between the middle guide rail or its straight section and each of the two outer guide rails, respectively, is maximized.

Automated landing of the aircraft can be accomplished by a method for landing a tethered aircraft, comprising the steps of approaching a ground site with said aircraft, thereby shortening free length of tether between the aircraft and the ground site until said free length of tether reaches a predetermined value, further approaching the ground site with said aircraft, thereby keeping free length of tether fixed at said predetermined value, retaining the tether to form a loop, wherein the loop is tensed and tightened by the moving aircraft, and damping said tightening of said loop in order to decelerate the aircraft until it stands at the ground site.

It is an aspect of the invention to decelerate the aircraft by use of the tether. This allows the aircraft to be decelerated prior to and after touch down alike or, in other terms, both in flight and when rolling on the ground. The aircraft thus can approach with released constraints on flight path, enabling completely autonomous flight of the aircraft during approach without any need for supervision and/or intervention by a human operator.

In case of deceleration in flight, it might happen that the aircraft gets decelerated below stall speed and thus drops the remaining distance to the runway. Preferably, the aircraft is equipped with a landing gear designed for such load conditions in order to fully explore the benefits provided by the invention.

It is another aspect of the invention that the majority of kinetic energy of the aircraft is dissipated by damping the tightening of a loop formed in the tether, which beneficially can be achieved by use of ground-based equipment. This allows maintenance of such equipment anytime, even when the aircraft is flying. Maintenance of such equipment thus does not compromise availability of the aircraft, for instance for airborne wind energy production.

It is yet another aspect of the invention that the aircraft is decelerated depending on its position. In particular, deceleration starts when the tether with fixed free length is tensioned and the loop in the tether starts to get tightened. Deceleration then continues until the aircraft does not move any further.

Since the length of tether has been fixed to a predetermined value or amount, the aircraft comes to a halt latest when the loop reduced to the minimum size allowed by construction.

When said value for fixed free length of tether is predetermined such that the decelerated aircraft comes to stand within a predetermined target area at said ground site, ground handling of the aircraft may be simplified and further automatized. In particular, automated systems can rely on the fact that the aircraft stands in a predefined target area after landing. Thus, the invention allows for simpler and thus easier-to-automate ground handling of the aircraft.

It is of advantage when the aircraft approaches the ground site against the wind, which is beneficial in terms of stable flight conditions and a lower allowable aircraft velocity upon approach. In general, an approach against the wind can increase the safety margin and thus leads to reduced constraints on the flight path for automated landing procedures.

It is further beneficial when a runway for the aircraft at said ground site is oriented to align with the direction of approach of the aircraft, which avoids the need for complex flight maneuvers. In general, an alignment of the runway with the direction of approach can increase the safety margin and thus leads to reduced constraints on the flight path for automated landing procedures.

It is most beneficial when the aircraft approaches against the wind, while the runway is aligned with direction of approach.

For performing such automated landing, the launch and land system according to the invention may comprise a retention system for forming a loop of the tether between the winch and the aircraft approaching the runway, wherein said retention system features a damping device for damping a tightening of said loop caused due to movement of the aircraft upon approach and landing in order to decelerate said aircraft.

For aligning the runway with the wind and/or with a direction of approach of the aircraft, the runway is for instance rotatable around a vertical axis.

In a preferred embodiment of the invention, the guiding device for the tether is arranged approximately in the middle of the runway and/or close to a rotational axis of the runway. This way, the guiding device can be arranged stationary even when the runway is orientable or rotatable.

It is further preferred that the guiding device is rotatable, preferably co-axially with rotatable runway, in order to enable straight guidance of the tether towards the airborne aircraft without sharp bends of the tether.

In a preferred embodiment of the invention, the retention device comprises a movable slider with a roller, wherein an axis of said roller is aligned essentially horizontal and across a direction of movability of said slider. For instance, said direction of movability of the slider is aligned with the runway. This arrangement provides for most simple and stable construction for forming a loop in the tether.

When said roller has a varying diameter along its axis, with larger diameter towards both ends and smaller diameter in between, the tether running over the roller is guided self-aligning without further lateral guides.

In a preferred embodiment of the invention, said roller comprises two concentric tubes, which are radially linked with each other by at least one flexible element, wherein the roller is supported at the slider via said inner tube and wherein the roller engages with the tether via said outer tube. In this embodiment, the flexible element serves as a cushion for dampening peak forces acting on the system, for instance when the initially slack tether in the loop is tightened and abruptly engages with the roller.

In a particular preferred embodiment of the invention, said damping device comprises a shock absorber, in particular a hydraulic shock absorber, for dissipating the kinetic energy of the aircraft.

It is further preferred when said damping device comprises a pulley assembly for connecting the slider to the shock absorber, wherein the pulley assembly in particular comprises at least one cable and at least one pulley to guide said cable. It is one advantage of this embodiment that a pulley block assembly can provide for a transmission with non-unity ratio between the slider and the shock absorber, allowing for a relatively long distance of slider movement to correspond to a relatively short stroke of the shock absorber. It is another advantage that a pulley block assembly provides for some flexibility, which helps to damped peak forces.

In another preferred embodiment of the invention, the retention device comprises a positioning mechanism for positioning said slider at least in an extended position for maximum retention of the tether and/or in a parking position for no engagement of the roller with the tether.

Figure 2:
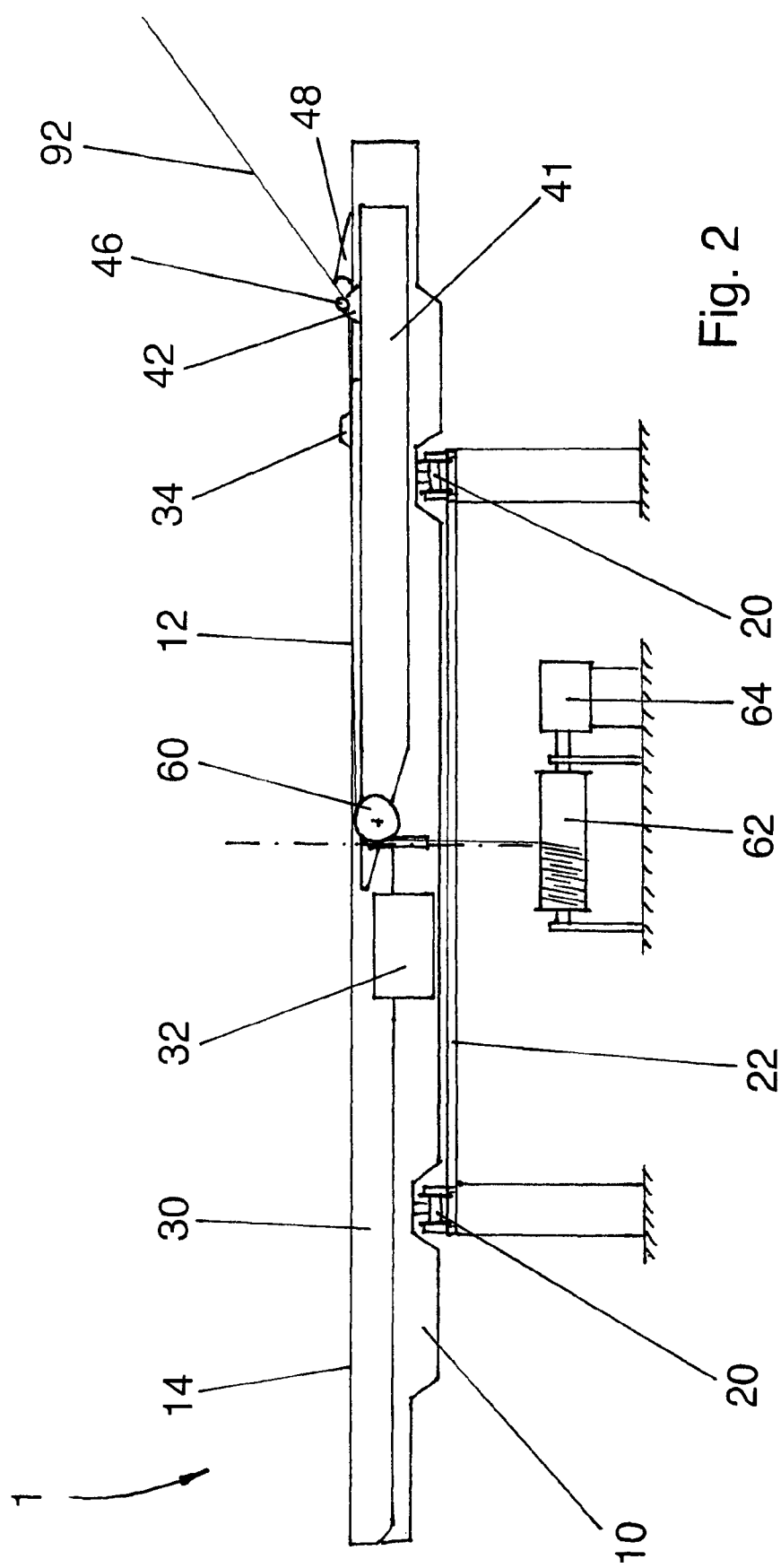
Figure 3:
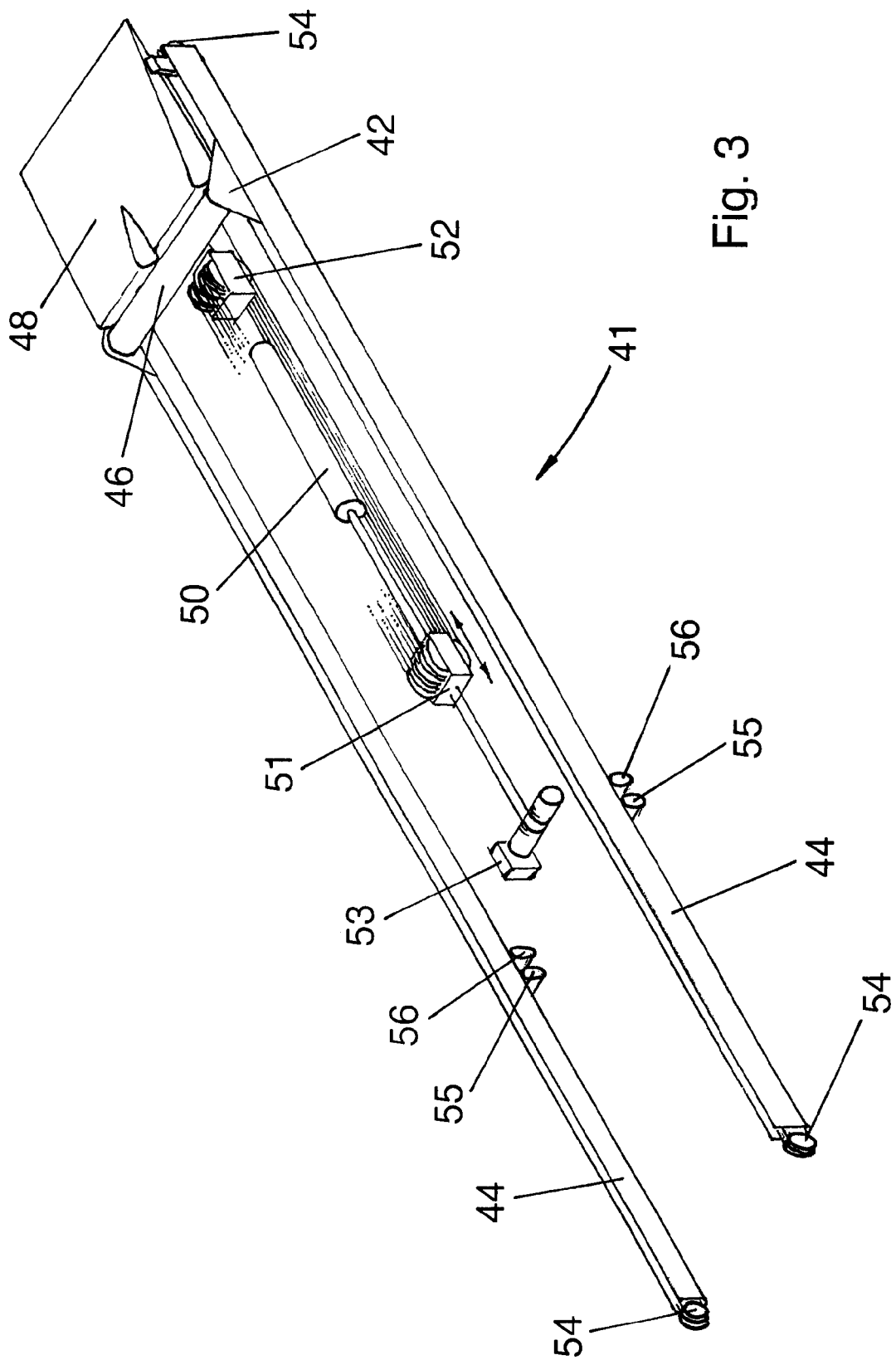
Figure 4:
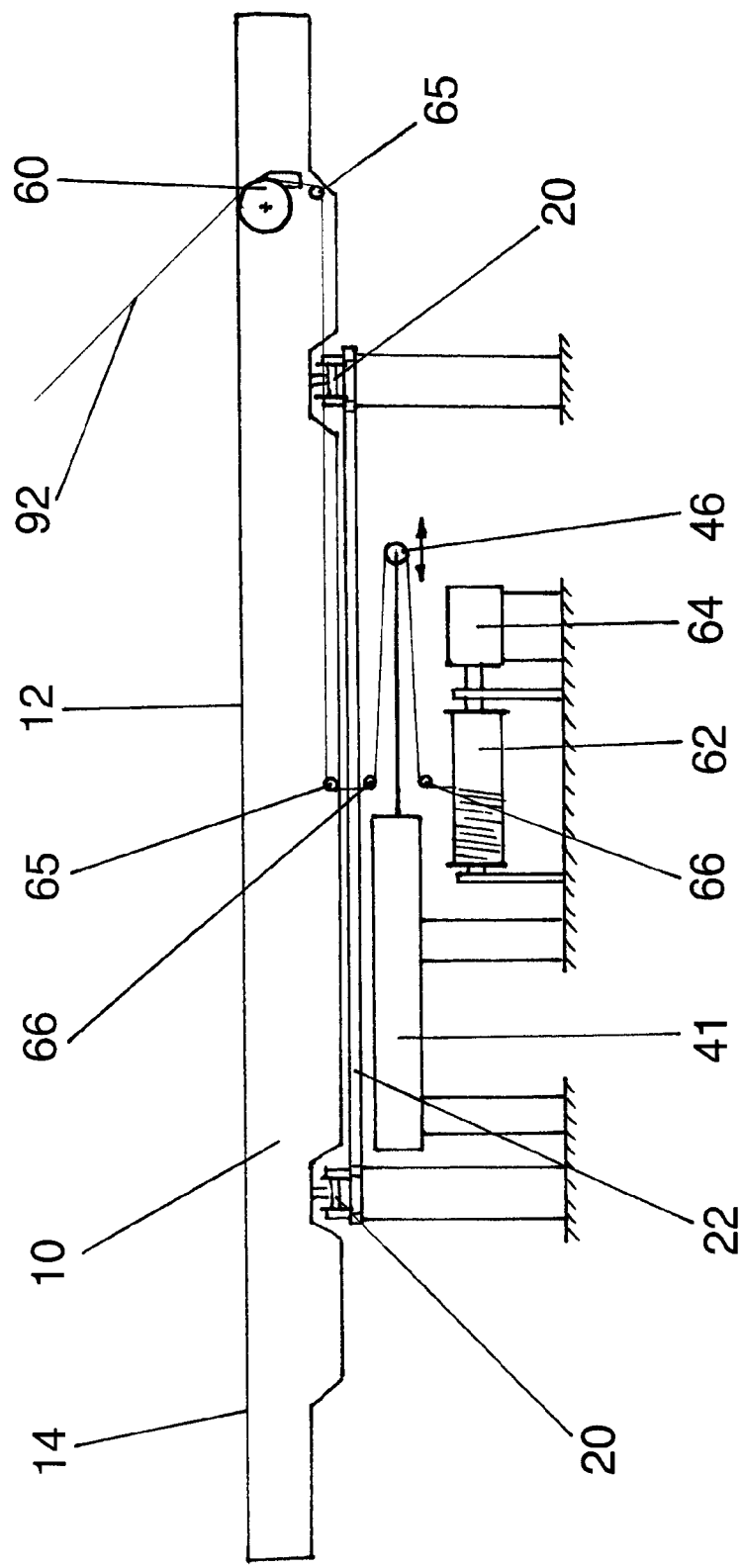
Figure 5A:
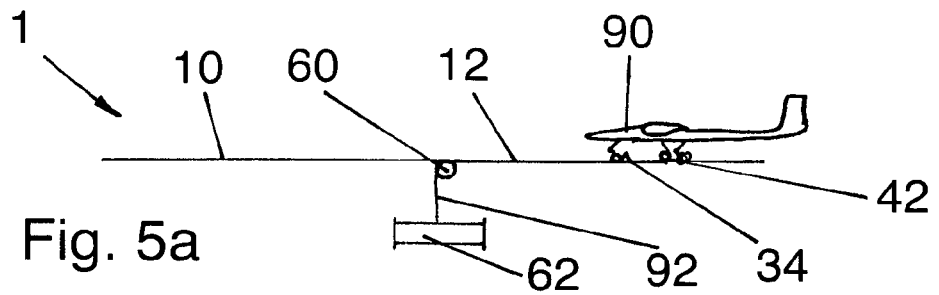
Figure 5B:
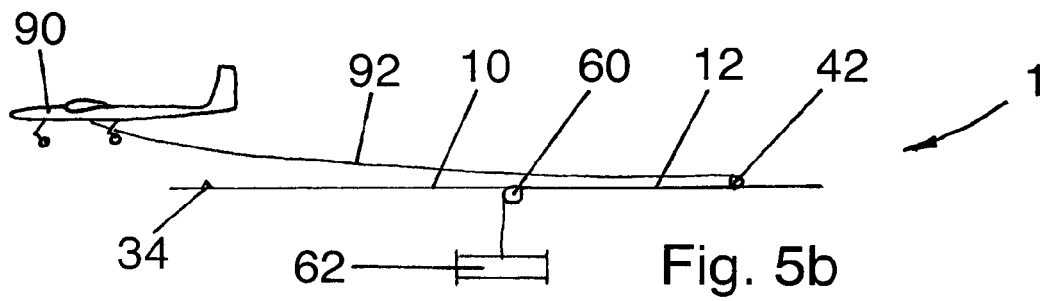
Figure 5C:
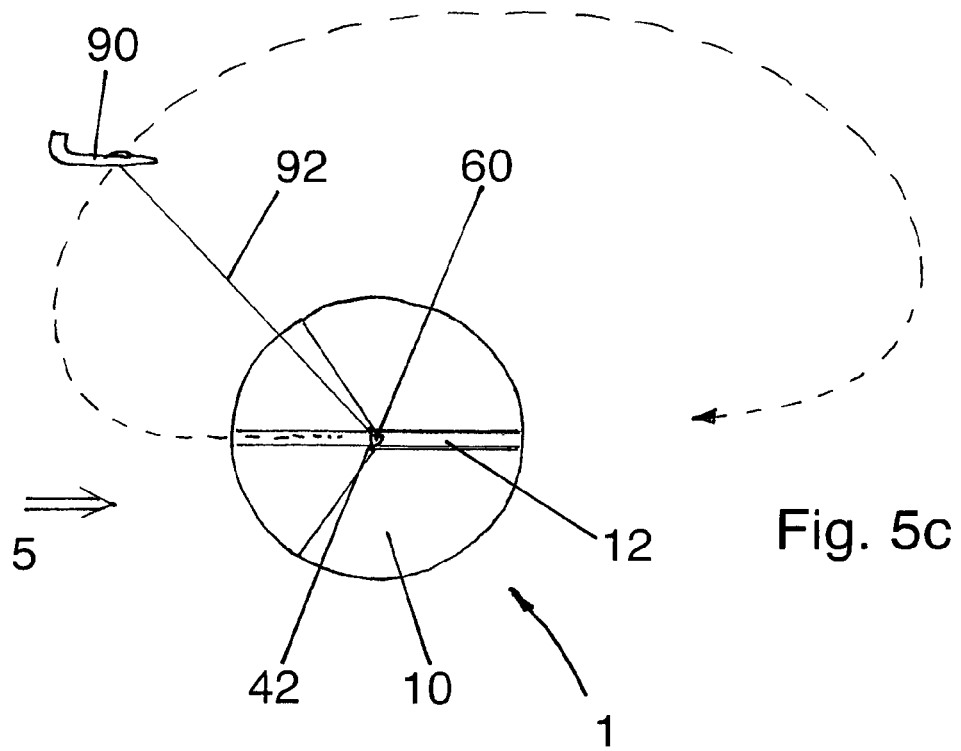
Figure 7C:
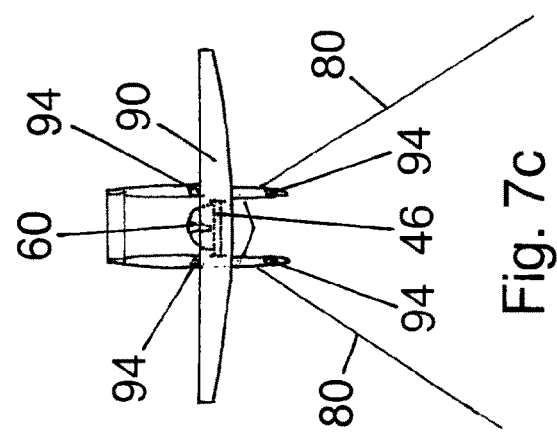
Figure 7B:
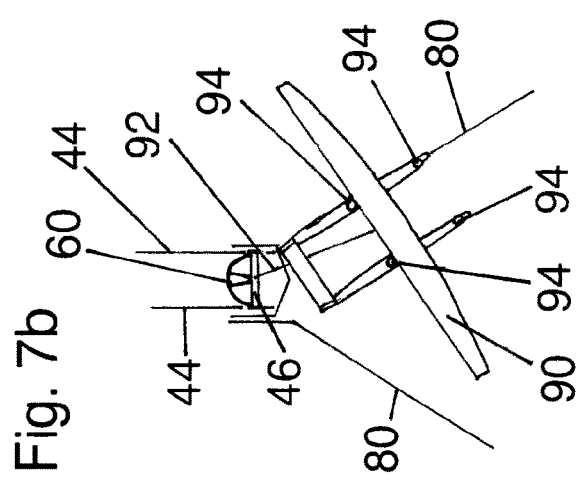
Figure 8:
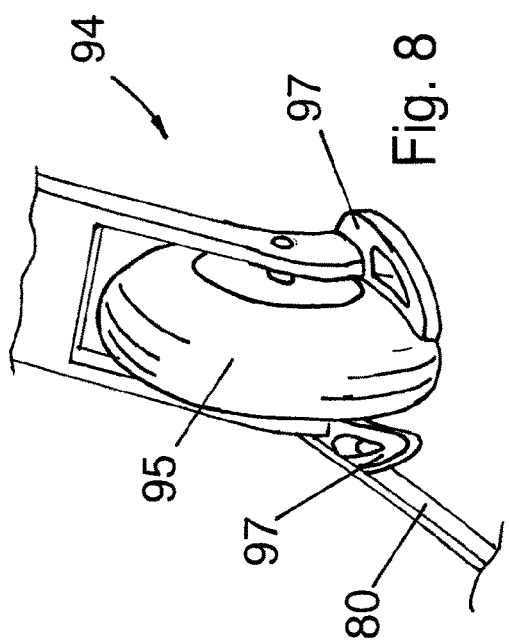
Figure 7A:
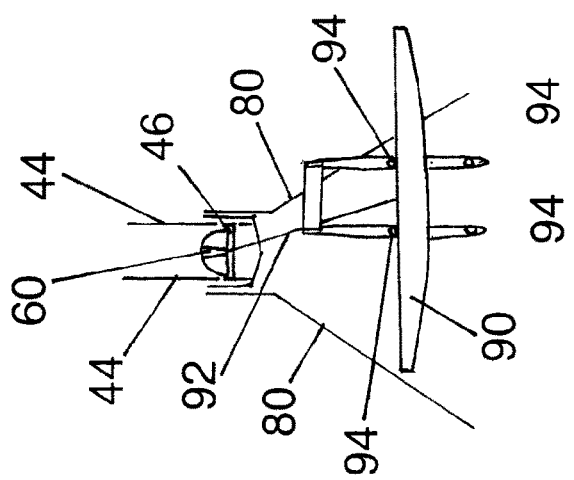
Figure 10:
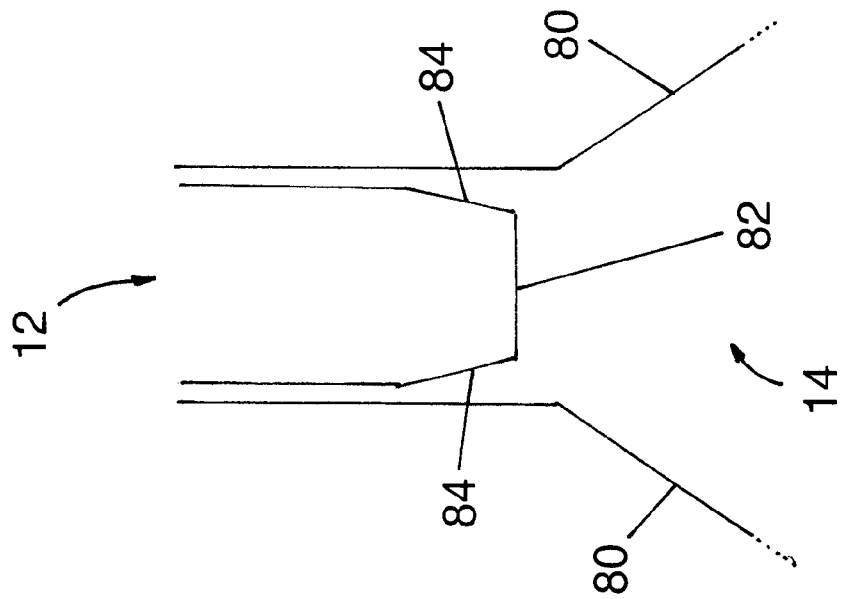
Figure 9:
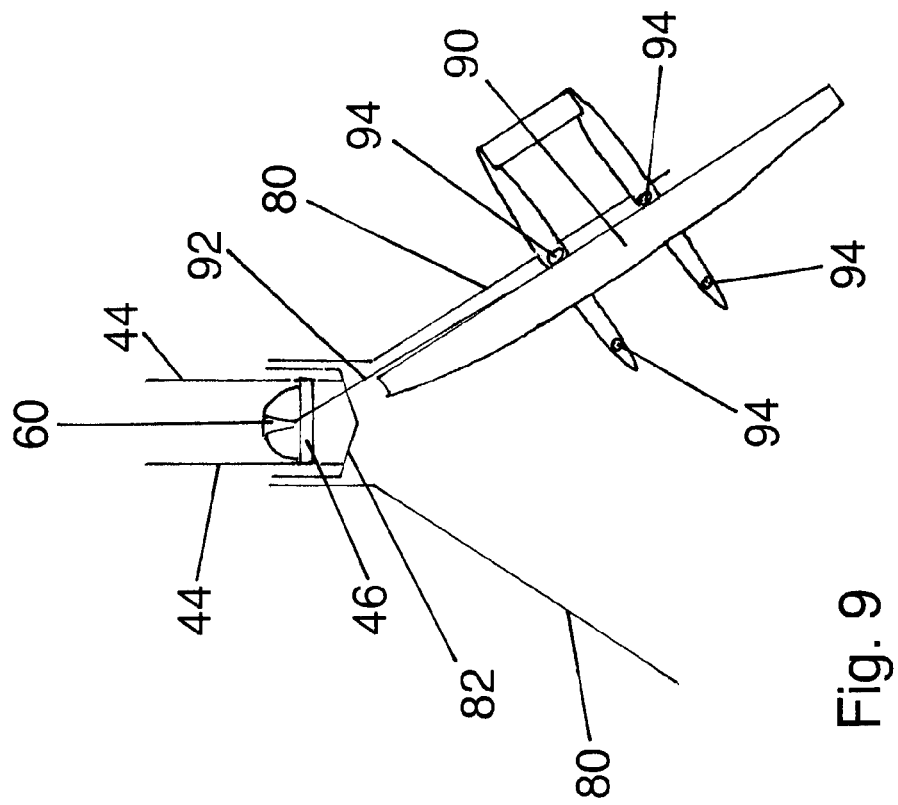

The invention is described below, without restricting the general intent of the invention, based on exemplary embodiments with reference to the drawings. The drawings show in:

FIG. 1 schematically an exemplary embodiment of a launch and land system according to the invention;

FIG. 2 schematically a sectional side view side of the launch and land system in FIG. 1;

FIG. 3 schematically a damping mechanism for a launch and land system according to the invention;

FIG. 4 schematically a sectional side view of an alternative launch and land system according to the invention;

FIG. 5*a-c* schematically an exemplary sequence for launching a tethered aircraft according to the invention;

FIG. 6*a-d* schematically an exemplary sequence for landing a tethered aircraft according to the invention;

FIG. 7*a-c* schematically an exemplary sequence for ground handling a tethered aircraft according to the invention;

FIG. 8 schematically details of a landing gear for automated ground handling according to the invention;

FIG. 9 schematically ground handling according to the invention of a misaligned aircraft; and FIG. 10 schematically an alternative embodiment of guide rails at the target area according to the invention.

In the drawings, the same or similar types of elements or respectively corresponding parts are provided with the same reference numbers in order to prevent the elements from needing to be reintroduced.

FIG. 1 shows an exemplary embodiment of a launch and land system 1 according to the invention. The launch and land system 1 comprises a platform 10. The platform 10 serves as a runway 12 for a tethered aircraft 90. The tether 92 is guided through the platform by means of a swivel mechanism 60, located essential in the center of the platform 10.

A slider 42 with a roller 46 is movable along rails 44 in order to capture the tether 92 close to the swivel mechanism 60, in order to form a loop of said tether 92. Rails 44 provide for an extended position for slider 42, where slider 42 is positioned at maximum distance from the swivel and thus retention of tether 92 is maximized. Rails 44 preferably also provide for a parking position for slider 42, where the roller 46 is disengaged from the tether 92.

A ramp 48 is provided to shield the slider 42 and the roller 46 from collisions with the landing gear 94 of the approaching aircraft 90.

The direction of approach of the aircraft 90 is indicated by arrow 91.

On the far end of the runway 12, as seen by the approaching aircraft 90, there is provided for a target area 14, where the aircraft 90 will come to a halt after landing and deceleration. The target area 14 is laterally bordered by guide rails 80. Said guide rails 80 restrict the aircraft 90 to remain inside the target area 14 when rolling across the platform 10 during ground handling.

The launch and land system 1 also comprises a catapult with two catapult arms 30 for launching the aircraft 90. For this purpose, each catapult arm 30 has a shuttle 34, respectively, which engage with the aircraft 90, for instance with the landing gear 94 of the aircraft, allowing to accelerate the aircraft 90 along the catapult arms 30.

FIG. 2 shows a sectional view of the launch and land system 1 as shown in FIG. 1 along the line A-A. As can be seen, the platform 10 comprises wheel sets 20 resting on a circular rail 22, thus allowing the platform 10 to rotate around a vertical axis, which is indicated by a dash-dotted line in FIG. 2.

Underneath the swivel mechanism 60, there is provided for a winch 62 with a winch drive 64 for the tether 92. By guiding the tether 92 along the axis of rotation of the platform 10, it is possible to position the winch 62 and winch drive 64 stationary underneath the platform 10. However, those skilled in the art will appreciate that this is just an example and that the winch 62 and winch drive 64 can also be arranged to move with the rotatable platform 10.

Also shown in FIG. 2 is a damping mechanism 41 connected to the slider 42, which is constructed and designed for damping movement of the slider 42 along the slider rails 44.

A catapult drive 32 is provided to drive the catapult shuttles 34 along the catapult arms 30, respectively. Those skilled in the art will appreciate that having one catapult drive 32 for two shuttles 34 of two catapult arms 30 is just an exemplary embodiment. In alternative embodiments of the invention, a separate catapult drive 32 can be foreseen for each of the shuttles 34, while other embodiments may have just one catapult arm 30 with one shuttle 34 and one catapult drive 32.

The slider 42 with roller 46 and the damping mechanism 41 are part of a tether retention system, which is shown in detail in FIG. 3. The slider 42 is movable along two slider rails 44. Inside the slider rails 44 run respective drive belts (not visible) running over sheaves 54 on either ends of the slider rails 44 and driven by respective slider drives 55 for positioning of the slider 42 along the slider rails 44.

Similarly, the ramp 48 is movable along the slider rails 44 by means of belts driven by respective ramp drives 56. In particular, the slider 42 and the ramp 48 can positioned independently from each other. Those skilled in the art will appreciate that it is also possible within the scope of the invention to couple slider 42 and ramp 48 for simultaneous movement by means of a common drive.

In addition to the mechanism for positioning the slider 42 as just described, the slider 42 is coupled to a shock absorber 50 via a pulley block assembly. For instance, the shock absorber 50 comprises a piston moving in a cylinder.

In the exemplary embodiment shown in FIG. 3, the pulley block assembly comprises a dynamic block 51 arranged at the movable part of the shock absorber 50, a static block 52 being fixed in position relative to shock absorber 50, and cables running over the pulley blocks 51, 52 and connected towards the slider 42. These cables are not shown entirely in FIG. 3 for reasons of simplicity. The pulley block assembly serves as transmission between the slider 42 and the shock absorber 50, respectively.

Said transmission provides for non-unity ratio of distance moved by the slider 42 and the stroke of the shock absorber 50, for instance for a ratio of six to one. At the same time, the transmission introduces a certain flexibility between the slider 42 and the shock absorber 50, in order to dampen abrupt forces acting on the slider 42 and/or the roller 46 of the slider 42.

As the slider 42 moves along the slider rails 44, the shock absorber 50 gets compressed. In order to uncompress the shock absorber 50, thereby moving the slider 42 backwards, a pulley block drive 53 acting on the dynamic pulley block 51 is provided.

As a matter of fact, the pulley block drive 53 and the slider drives 55 potentially counteract and block each other. It is therefore beneficial when at least one of said drives 53, 55 can be switched to minimum counter torque and/or can be mechanically disengaged from the slider 42, for instance by means of a clutch and/or a torque limiter.

FIG. 4 shows an alternative embodiment of the invention in a sectional view similar to the view depicted in FIG. 2. In this embodiment, the damping mechanism 41 and the roller 46 are positioned stationary with the winch 62 and the winch drive 64, respectively. This reduces the number of elements on the rotatable platform 10. In this embodiment, the swivel mechanism 60 is located close to the outer circumference of the platform 10 in order to make almost the full platform diameter available for the runway 12. Sheaves 65 on the platform 10 and sheaves 66 arranged stationary are used to guide the tether 92 from the swivel mechanism 60 over the roller 46 to the winch 62.

FIGS. 5 a-c illustrate the sequence of automated launching according to the invention of a tethered aircraft 90. FIG. 5a shows the launch and land system 1 according to the invention as described in FIGS. 1-3 with the aircraft 90 position at one end of the runway 12, the landing gear 94 in engagement with the catapult shuttles 34 and the slider 42 positioned underneath the aircraft 90. The aircraft 90 is accelerated by the catapult shuttles 34 to a velocity fast enough for the aircraft 90 to take off (FIG. 5b), thereby pulling the tether 92 from the winch 62. Until now, the slider 42 remains essentially in the initial position, with the damping mechanism 41 eventually smoothening out peak forces occurring while pulling out the tether 92.

FIG. 5c shows a top view of the launch and land system 1 according to the invention and of the flight path during launching sequence of the aircraft 90. As can be seen, the runway 12 has been aligned to start the aircraft 90 against the wind, which is indicated by arrow 5. Successively, the initial velocity of the aircraft 90 gained from the catapult start is used to fly an arc with increasing distance to the platform 10 towards the downwind side of the launch and land system 1. Once the aircraft 90 is downwind of the launch and land system 1, the winch 62 is driven by the winch drive 64 to pull the aircraft 90 towards the platform 10 against the wind 5, allowing the aircraft 90 to gain altitude.

Simultaneously, the slider 42 is moved along the slider rails 44, eventually crossing the swivel mechanism 60 in the center of the platform 10, thereby disengaging from the tether 92. This way, the roller 46 of slider 42 does not touch the tether 92 during normal flight operation, which beneficially avoids unnecessary wear on the roller 46 and/or the tether 92, respectively.

Once enough altitude is reached, the aircraft 90 is ready for normal flight operation, for instance for harvesting wind energy for production of electricity. Such operation is for instance described in detail in EP 2 631 468 A1, see in particular FIGS. 2a and 2b with corresponding description within this document.

During normal flight operation of the aircraft 10, the platform 10 or the runway 12, respectively, remain preferably aligned with the wind 5. It is further beneficial when the swivel mechanism 60 turns relative to the platform 10 in order to follow the flight pattern of the aircraft 90 to ensure straight guidance of the tether 92 through the platform 10, which minimizes wear on the tether 92.

The sequence of automated landing according to the invention of the tethered aircraft 90 is illustrated by FIGS. 6 a-d.

FIG. 6a shows the initial approach of the aircraft 90 towards the launch and land system 1 according to the invention. During the approach, the tether 92 is reeled in by means of the winch 62 and winch drive 64, which shortens the free length of tether 92 between the aircraft 90 and the winch 62. During this phase, the tether 92 is for instance kept approximately straightened without exerting significant pulling force on the aircraft 90.

When the free length of tether 92 reaches a predetermined value, operation of the winch 62 is ceased and the winch 62 is locked in order to keep the free length of tether 92 constant. Alternatively, a break acting on the tether 92, which for instance is located at or close to the swivel mechanism 60, is closed, thereby holding tight on the tether 92. At this point in time, the slider is positioned at the extreme position for maximum retention of the tether 92, with the tether 92 running below the roller 46 of the slider 42. With the free length of tether 92 fixed and the aircraft 90 still moving, the tether 92 falls slack as the aircraft 90 moves over the slider 42. This phase of landing is depicted in FIG. 6b.

When the aircraft 90 crosses the slider 42, either in flight or rolling on the runway 12, a loop is formed in the tether 92 extending from the swivel mechanism 60 over the roller 46 to the aircraft 90. The tether 92 in this loop is initially slack (cf. FIG. 6b), as described above, and tensioned by the moving aircraft 90 (cf. FIG. 6c).

As the tether 92 in the loop is straightened out, the moving aircraft 90 is exerting a pull on the slider 42 via the roller 46, which is also acting on the shock absorber 50. Thus, the kinetic energy of the aircraft 90 is dissipated by the shock absorber 50. Regardless whether the aircraft 90 is still flying or already has touched ground and is rolling on the runway 12, the aircraft 90 is thereby decelerated until coming to a complete halt within the target 14 before the end of the runway 12 on the platform 10 (cf. FIG. 6d).

After the aircraft 90 has been landed and decelerated to a stop within the target area 14, the invention also provides for automated ground handling of the aircraft 90, in particular for aligning and securing the aircraft 90 on top of the platform 10.

For this purpose, the platform 10 comprises guide rails 80 on either side of the target area 14. These guide rails 80 are arranged in a funnel-shaped way with the wider side of the funnel being oriented towards an edge of the platform 10 and the narrower side of the funnel being oriented towards the swivel mechanism 60.

By using the winch 62 and winch drive 64 together with the tether 92, the aircraft 90 standing in the target area 14 is pulled backwards to the narrow side of the funnel, as illustrated by FIGS. 7 a-c. The aircraft 90 eventually is pulled against one of the guide rails 80. The guide rails 80 in particular provide a step or edge, constraining the aircraft 90 to within the target area 14.

For instance, as shown in FIG. 8, the landing gear 94 of the aircraft 90 is equipped with guiding devices 97 adjacent to the wheels 95, which are suited to engage with the guide rails 80 in order to avoid the landing gear 94 to roll over said guide rails 80.

Due to the funnel shaped arrangement of the guide rails 80, the aircraft 90 is guided towards a defined position within the narrow side of the funnel shape of the target area 14 when pulled backwards by means of the tether 92. This way, the aircraft 90 is for instance brought to a target position with defined orientation directly above the swivel mechanism 60, where the aircraft 90 can either be secured for parking or can be loaded onto the catapult system for re-launch.

FIG. 9 schematically depicts an example where the aircraft 90 is misaligned. Here, the aircraft 90 has been pulled back such that the two rear wheels of the landing gear 94 rolled towards one of the guide rails 80. Further pulling on the tether 92 will now drag the aircraft 90 sideways with the wheels sliding perpendicular to their circumference.

The aircraft 90 is pulled further, causing the wheel closest to the swivel mechanism 60 to engage with the middle guide rail 82. Supported by the fixed spacing between the wheels of the landing gear 94 plus the angle between the guide rail 80 and the middle guide rail 82, respectively, said wheel is deflected in a lateral direction along middle guide rail 82. As a consequence, the aircraft 90 turns and thus is re-oriented to align properly with the runway 12. As a result, the aircraft 90 reaches the final and intended position and orientation as depicted in FIG. 7c. As can be seen, the invention does not require any dedicated non.standard handling in the case of misalignment of the aircraft 90.

An alternative example of the invention with modified middle guide rail 82 is shown in FIG. 10. In this embodiment, middle guide rail 82 comprises a straight middle section, which makes up most of the width middle guide rail 82 and is aligned perpendicular to runway 12. In order to avoid dead-lock positions where one wheel of the landing gear 94 is pulled against an edge 84 of middle guide rail 82, edges 84 of middle guide rail 82 at the end of the straight section are rounded off or cut away, respectively.

REFERENCES 1 launch and land system
5 wind
10 platform
12 runway
14 target area
20 wheel set
22 circular rail
30 catapult arm
32 catapult drive
34 catapult shuttle
41 damping mechanism
42 slider
44 slider rail
46 roller
48 ramp
50 shock absorber
51 dynamic pulley block
52 stationary pulley block
53 pulley block drive
54 sheave 55 slider drive
56 ramp drive
60 swivel mechanism
62 winch
64 winch drive
65 sheave
66 sheave
80 guide rail
82 middle guide rail
84 treated edge
90 aircraft
91 direction of approach
92 tether
94 landing gear
95 wheel
97 guiding device

The invention claimed is:

1. A launch and land system for an aircraft tethered to a ground site by a tether, comprising:
   a runway configured for landing gear wheels of the aircraft to roll on; and
   a winch for the tether;
   wherein the runway comprises a funnel-shaped target area with a wide end oriented towards one end of the runway and a narrow end opposite of the wide end, and
   wherein said target area is laterally bordered by restriction devices extending from the wide end of the target area to the narrow end for preventing the aircraft from rolling out of the target area.

2. The launch and land system according to claim 1, wherein said launch and land system further comprises a guiding device for said tether.

3. The launch and land system according to claim 2, wherein said guiding device is arranged close to the narrow end of the target area.

4. The launch and land system according to claim 2, wherein said guiding device comprises a swivel mechanism.

5. The launch and land system according to claim 1, wherein said restriction devices comprise guide rails for guiding a landing gear of said aircraft.

6. The launch and land system according to claim 5, wherein said guide rails are configured for engagement with guiding surfaces provided at the landing gear of the aircraft.

7. The launch and land system according to claim 1, wherein the launch and land system further comprises a reorientation device arranged at the narrow end of the funnel-shaped target area for aligning the grounded aircraft with the runway.

8. The launch and land system according to claim 7, wherein the reorientation device comprises a middle guide rail generally arranged across the narrow end of the funnel-shaped target area.

9. The launch and land system according to claim 8, wherein the middle guide rail comprises a straight section, wherein the straight section is aligned approximately perpendicular to the runway.

\* \* \* \* \*